United States Patent Office 3,184,325
Patented May 18, 1965

3,184,325
COATING METAL WITH AN AMINOPHENOL OR AMINOALKYLPHENOL TREATED POLYOLEFIN POWDER
Lee O. Edmonds, Bartlesville, Okla., assignor to Phillips Petroleum Company, a corporation of Delaware
No Drawing. Filed May 1, 1961, Ser. No. 106,518
6 Claims. (Cl. 117—21)

This invention relates to method and composition for metal coating and improved metal coated objects therefrom. More specifically, this invention relates to the providing of an improved fluidized bed for the coating of metal objects and the imparting of improved properties to the metal objects thus coated. In one aspect, this invention relates to providing novel compositions for fluidized bed coating. Another aspect of this invention relates to novel additives to be utilized in the fluidized bed coating operation. A still further aspect of this invention relates to the imparting of improved properties to a metal coated object.

The coating of metal surfaces with resinous materials by the fluidized bed technique is well known and it has been found that polyolefins, particularly polyethylene, can be effectively applied by such means. The coatings so applied are smooth and attractive in appearance and are useful in numerous applications. However, it has been observed that adhesion of such coatings is frequently weak and that when objects coated in this manner are exposed to a corrosive environment, corrosion of the substrate occurs with concurrent loosening of the coating.

In such fluidized bed coating operations, it is common practice to prepare the surface to be coated by removal of oxides or any residual coatings or contaminants, thus presenting a clean metal surface for reception of the resin and, heretofore, failures in adhesion have frequently been attributed to imperfect removal of contamination. However, even with most thorough cleaning by grit blasting, wire brushing, or sanding, failures in a corrosive environment continue to occur after brief exposures thereto.

Therefore, one of the objects of this invention is to provide coated metal objects having improved corrosion properties. Another object of this invention is to provide coated metal objects having improved coating adhesion properties. Still another object of this invention is to provide an improved coating composition for metal objects.

Other aspects, objects and the several advantages of the invention will be apparent upon examination of the disclosure and the appended claims.

I have now discovered a method for the coating of metal surfaces with a polyolefin, particularly with polyethylene, by a fluidized bed technique wherein the foregoing difficulties are eliminated or substantially reduced. According to the present process, the powdered resin is subjected to a pretreating step wherein a small amount of a compound from the group consisting of aminophenols and aminoalkyl phenols is applied thereto.

The pretreating agents of the invention are compounds of the general formula

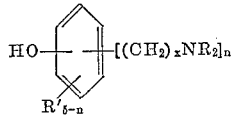

in which R and R' are hydrogen or an alkyl group containing from 1 to 3 carbon atoms, x is a number from 0 to 2, and n is an integer from 1 to 3. Typical of these compounds are o- m-, and p-Aminophenols
2,4-diaminophenol
2,4,6-triaminophenol
m-Diethylaminophenol
p-Dipropylaminophenol
2,4,6-tri(dimethylamino)phenol
o-, m-, and p-Dimethylaminophenol
o-, m-, and p-Dimethylaminomethylphenol
2,4,6-tri(dimethylaminomethyl)phenol
2,4,6-tri(diethylaminomethyl)phenol
2,4,6-tri(dimethylaminoethyl)phenol
2,4,6-tri(dipropylaminoethyl)phenol
o-, m-, and p(Monoisopropylaminoethyl)phenol
2,5-di(monopropylaminoethyl)phenol
3,5-di(monoethylamino)phenol
3,4-di(monomethylaminomethyl)phenol
2-methyl-5-(dimethylamino)phenol
3-isopropyl-4-aminophenol
2,4-di-n-propyl-3,5-di(di-n-propylaminoethyl)phenol
2-methyl-3-amino-4-ethylphenol
3,5-di(methylethylaminomethyl)phenol
2,4,6-triamino-3,5-dimethylphenol and the like. Of these, the tri(dimethylaminomethyl)-phenols are presently preferred.

The pretreating agent is applied to the pulverulent resin in an amount between 0.005 and 1.0, preferably between 0.01 and 0.5 weight percent based on the polymer used. Application can be by any suitable means, a convenient method being to dissolve the treating agent in a low boiling hydrocarbon solvent such as pentane and spray this solution on the resin powder in an amount to provide the desired concentration, the powder being thoroughly stirred during and/or after application, for example in a tumbling drum. After application, the volatile solvent is removed by evaporation, either at room temperature or a slightly higher level, and in a current of air, if desired.

The pretreated polyolefin powder is then charged to a fluidizer comprising a containing vessel having a perforated disc at the bottom below which a fluidizing gas, such as air, can be admitted under controlled pressure. With the polymer bed in fluidized state, the article to be coated, thoroughly cleaned and heated to a temperature in the range between 300 and 500° F., is plunged into the pretreated pulverulent powder. It is then removed and returned to the heating zone where, at a temperature of from 300 to 500° F., the adherent coating becomes smooth and homogeneous. This dipping and post heating treatment can be repeated as many times as necessary to provide a coating of the desired thickness.

The postheating step, being concerned principally with surface characteristics only, is generally only long enough to smooth the coating, say, from 5 to 30 seconds, although longer periods can be used, for example up to about 5 or 10 minutes.

The olefin polymers used include both high and low density polyethylenes, polypropylene, poly-1-butene, and the like, as well as copolymers such as the copolymer of ethylene and 1-butene. The polyolefin powder used is preferably of a particle size sufficiently small to pass a 40 mesh screen, grinding being effected by any suitable procedure.

The pretreated olefin polymer coatings of the invention can be applied to substantially any metal article but are particularly adaptable to the coating of iron or steel for the prevention of corrosion in corrosive environment, e.g., submerged in or adjacent to salt brines such as sea water or oil field waters.

EXAMPLE

A high density (0.960 gm./cc.) polyethylene fluff was pulverized to a particle size which would pass a 40 mesh screen and pretreated with 2,4,6-tri(dimethylaminomethyl)phenol by dissolving the additive in pentane and spraying over the powder with stirring. The pentane was evaporated at room temperature after which the powder was fluidized by a stream of air in a metal container. Steel coupons were heated to a temperature of 450° F., dipped in the powder, reheated and dipped again and postheated at 450° F., for 7 minutes to provide coatings 8 mils in thickness. These coatings were tested with a high voltage coil to locate pinholes if any were present. The coated coupons were immersed in 10 percent brine to 50 percent of their length and allowed to stand for several weeks, observations being made from time to time to note any deteriorations in the coating. Controls with untreated polyethylene were run simultaneously.

Since the additives of the invention are of a type known to be useful as rust inhibitors in lubricating oils, other known rust inhibitors for lubricating oils were applied to portions of the same powdered polyethylene in the same manner and tests run on coated coupons to determine comparative effects.

Another test made on the coupons at the end of each test period involved attempting to separate the film from the metal with a knife blade.

Data on these tests are presented in the following tabulation.

Table

| Additive | Amt., percent | No. Samples Good After— | | | | Knife Test Rating |
|---|---|---|---|---|---|---|
| | | 1 Wk. | 2 Wk. | 3 Wk. | 4 Wk. | |
| None | | 3 | 3 | 1 | None | Poor. |
| DMP-30 [a] | 0.05 | 3 | 3 | 3 | 2 | Good. |
| Para-Bar 448 [b] | 0.05 | 3 | 3 | 2 | None | Poor. |
| LZ-1211 [c] | 0.20 | 3 | 1 | None | None | Poor. |
| Petroleum Sulfonate [d] | 0.20 | 3 | 3 | 2 | None | Poor. |

[a] Rohm and Haas 2,4,6-tri(dimethylaminomethyl) phenol.
[b] Enjay sulfur containing organic rust inhibitor.
[c] Lubrizol superbased sulfonate inhibitor containing barium and calcium.
[d] Calcium salt of a sulfonated paraffinic petroleum fraction.

Reasonable variation and modification are possible within the scope of the foregoing disclosure and appended claims to the invention, the essence of which is that there have been provided a method and composition for coating metal objects and improving the corrosion and adhesion properties of such objects and, further, providing metal surfaces having thereon a coating which imparts improved properties to same which comprises essentially subjecting polyolefin resin to a pretreatment step in which a very small amount of a compound of the general formula

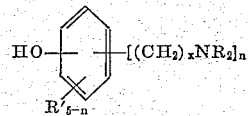

is combined therewith and utilizing same as a fluidized bed and, subsequently, coating metals with the treated polyolefin by dipping the heated metal into a fluidized bed of pulverulent resin.

I claim:

1. A process for coating a metal surface with a polyolefin coating comprising coating the surface of powdered polyolefin with a compound selected from the group consisting of aminophenols and aminoalkylphenols of the formula

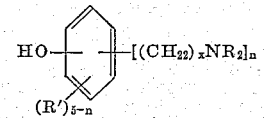

wherein R and R' are selected from the group consisting of hydrogen and an alkyl group containing from 1 to 3 carbon atoms, $x$ is a number from 0 to 2, and $n$ is an integer from 1 to 3, charging coated powdered polyolefin to a fluidized bed, heating said metal surface to a temperature sufficient to cause particulate polyolefin to adhere to said metal surface, and charging said heated metal surface into said fluidized bed.

2. A process according to claim 1 wherein the powder-coating operation comprises forming a solution of said compound and a solvent, spraying said solution onto said coating material while stirring same in an amount to provide the desired concentration and subsequently removing the solvent therefrom.

3. A process according to claim 1 wherein said polyolefin is polyethylene.

4. A process according to claim 1 wherein about .005 to about 10 weight percent based on weight of polyolefin of said compound is employed.

5. A process according to claim 1 wherein about .01 to about .5 weight percent based on weight of polyolefin of said compound is employed.

6. A process according to claim 1 wherein said compound is tri(dimethylaminomethyl)phenol and said polyolefin is a high density polyethylene.

References Cited by the Examiner
UNITED STATES PATENTS

| 2,844,489 | 7/58 | Gemmer | 117—21 X |
| 2,997,455 | 8/61 | Broich et al. | 260—45.9 |
| 3,061,882 | 11/62 | Wolinski | 117—161 |

RICHARD D. NEVIUS, *Primary Examiner.*